United States Patent [19]

Rigler et al.

[11] 4,228,244
[45] Oct. 14, 1980

[54] PROCESS FOR PREPARING FINE PARTICLE EXPANDABLE STYRENE POLYMERS CONTAINING SMALL CONCENTRATIONS OF ORGANIC BROMINE COMPOUNDS

[75] Inventors: Josef K. Rigler; Horst Leithäuser; Karl Trukenbrod, all of Marl; Werner Ogrzewalla, Dorsten, all of Fed. Rep. of Germany

[73] Assignee: Chemische Werke Hüls AG, Marl, Fed. Rep. of Germany

[21] Appl. No.: 70,814

[22] Filed: Aug. 29, 1979

[30] Foreign Application Priority Data

Sep. 16, 1978 [DE] Fed. Rep. of Germany ....... 2840355

[51] Int. Cl.$^2$ ............................ C08J 9/12; C08J 9/14; C08J 9/16; C08J 9/22
[52] U.S. Cl. ........................................ 521/56; 521/60; 521/98; 521/131; 521/146; 521/907
[58] Field of Search ..................... 521/56, 60, 98, 131, 521/146, 907

[56] References Cited

U.S. PATENT DOCUMENTS

| | | | |
|---|---|---|---|
| 2,658,877 | 11/1953 | Dreisbach et al. | 521/98 X |
| 2,676,927 | 4/1954 | McCurdy et al. | 521/98 X |
| 3,004,935 | 10/1961 | Raley et al. | 521/98 X |
| 3,058,926 | 10/1962 | Eichhorn | 521/98 X |
| 3,093,599 | 6/1963 | Mueller-Tamm et al. | 521/60 X |
| 3,188,295 | 6/1965 | Ballast et al. | 521/98 X |
| 3,389,097 | 6/1968 | Ingram et al. | 521/60 |
| 3,441,524 | 4/1969 | Burger et al. | 521/60 |
| 3,455,873 | 7/1969 | Jenkner | 521/98 X |
| 3,472,799 | 10/1969 | Burger et al. | 521/98 X |
| 3,503,905 | 3/1970 | Zuern et al. | 521/59 |
| 3,576,771 | 4/1971 | Howell et al. | 521/60 X |
| 3,635,850 | 1/1972 | Birkner et al. | 521/98 X |
| 3,804,783 | 4/1974 | Howell et al. | 521/98 X |
| 3,817,912 | 6/1974 | Diebel et al. | 521/98 X |
| 3,819,547 | 6/1974 | Pillar et al. | 521/60 |
| 3,826,766 | 7/1974 | Howell et al. | 521/98 X |
| 3,956,203 | 5/1976 | Burger et al. | 521/98 X |
| 3,975,327 | 8/1976 | Nintz et al. | 521/98 X |
| 4,020,022 | 4/1977 | Biglione et al. | 521/98 X |
| 4,113,672 | 9/1978 | Pillar | 521/60 |
| 4,166,161 | 8/1979 | Noetzel | 521/98 X |

FOREIGN PATENT DOCUMENTS

2542281  3/1977  Fed. Rep. of Germany .

*Primary Examiner*—Howard E. Schain
*Attorney, Agent, or Firm*—Gilbert L. Wells

[57] ABSTRACT

The process for the preparation of shaped bodies based on expanded styrene polymers comprising: the polymerization of styrene or a mixture thereof with at least one monomer copolymerizable therewith, the addition of an expanding agent, pre-forming of the resulting expandable particles, ageing of the pre-formed particles, and molding thereof in a pressure resistant mold, is improved in the decrease of the minimum mold dwell time by carrying the polymerization in the presence of 0.0005 to less than 0.01% by weight based on the styrene polymer of organic bromine compounds which give a chain transfer constant of at least 200 and at 100° C. in bidistilled water the bromine compounds split off less than one molar % of hydrogen bromide per equivalent of bromine present in the molecule.

10 Claims, No Drawings

PROCESS FOR PREPARING FINE PARTICLE EXPANDABLE STYRENE POLYMERS CONTAINING SMALL CONCENTRATIONS OF ORGANIC BROMINE COMPOUNDS

CROSS-REFERENCE TO A RELATED APPLICATION

Applicants claim priority under 35 USC 119 for application P 28 40 355.6, filed Sept. 16, 1978 in the Patent Office of the Federal Republic of Germany.

BACKGROUND OF THE INVENTION

The field of the invention is pore-forming synthetic resins from foamed or foamable beads. The invention is particularly concerned with fine particle expandable styrene polymers containing small concentrations of organic bromine compounds to reduce the mold dwell time.

The state of the art of foamed polystyrene may be ascertained by reference to the Kirk-Othmer, "Encyclopedia of Chemical Technology," 2nd Edition, Vol. 9 (1966) under the section entitled "Foamed Plastics," pages 847–884 and Vol. 19 (1969) under the section entitled "Styrene Plastics," pages 85–134, particularly pages 116–120, where polystyrene foams are disclosed and pages 120, 121 where prior art hexabromocyclodecane is disclosed and U.S. Pat. Nos. 3,389,097; 3,503,905; 3,682,844; 3,789,028; 3,972,843 and 4,020,022, the disclosures of which are incorporated herein.

A process which has proved particularly practical in industry prepares molded objects by expanding fine-particulate, foamable styrene polymers in molds as disclosed by H. L. von Cube & K. E. Pohl in "Die Technologie des schaeumbaren Polystyrols," 1965. According to this process, the fine-particulate styrene polymers are first heated by means of steam or hot gases to temperatures above their softening points, whereby foaming takes place into discrete particles. This procedure denoted as pre-foaming. The pre-foamed polystyrenes are then temporarily stored and later further expanded by additional steam heating in a pressure-resistant mold whereby the particles weld into one another to a molded body corresponding to the inside cavity of the mold. This second procedure is denoted as final foaming. The molded object, after final foaming, is cooled inside the mold until the inside temperature drops below the softening point. When the molded object is prematurely removed from the mold, the object deforms. As foam plastics are good insulators, relatively long cooling times are required to cool the mold. The time interval allowing the earliest removal of the molded object without deformation is ordinarily called the "minimum mold dwell time."

It is therefore obvious that the processors of expandable polystyrene desire short minimum dwell times for reasons of economy. Accordingly, there have been many attempts in the past to make fine-particulate, expandable styrene polymers with low minimum mold dwell times. The prior art reveals numerous approaches leading to polystyrene foams with low minimum mold dwell times.

It is recommended, for example, to use fatty acid derivatives in concentrations between 0.1 and 2% by weight referred to the styrene polymer in order to achieve a low minimum mold dwell time as disclosed in U.S. Pat. Nos. 3,389,097 and 3,789,028 and British Pat. No. 1,408,267.

It is furthermore known to add various kinds of rubber in concentrations between 0.1 and 2% by weight referred to the styrene polymer as disclosed in U.S. Pat. Nos. 3,682,844; 3,972,843 and 4,020,022, British Pat. No. 1,297,105 and Japanese Published Application No. 49 052 862.

According to U.S. Pat. No. 3,503,905 and French Pat. No. 15 30 701 and British Pat. No. 1,171,657, brominated compounds are added to the polymerization inputs so that the bromine compounds are homogeneously distributed.

All the prior art processes, however, suffer from the drawback that the substances used negatively affect other processing properties of the expandable styrene polymers. Fatty acids or fatty acid derivatives and rubbers must be added in so high a concentration to achieve an appreciable lowering of the minimum mold dwell time that the softening point of the expandable styrene polymer is markedly lowered. This results in drawbacks both in processing, for instance, adhesion of the pre-foam, and a decrease in the strength of the final product. Beyond that, the economy of the process is decreased due to the high costs of the additives.

Also, relatively high concentrations of between 0.02 and 0.5% by weight are required for the bromine compounds recommended for lowering the cooling time if such is actually to be achieved. Such additives too, however, result in adverse effects on the mechanical properties of the foam and in particular as regards dimensional stability with respect to heat. Further, bromine compounds are frequently injurious to health.

Accordingly, attempts have recurringly been undertaken in the past to make do without adding foreign substances. Thus, British Pat. No. 1,082,966 recommends that the beads be very quickly cooled prior to foaming. French Pat. No. 15 00 623 recommends intermediary storage of the pre-foam to achieve a decrease in pressure and thereby a low minimum mold dwell time. However, neither process was found actually practical as these steps failed to achieve sufficiently short cooling times.

West German Published Application No. 2,542,281, the disclosure of which is incorporated herein, discloses criteria for special bromine compounds suitable as additions to expandable styrene polymers where the bromine compounds are sensitive to hydrolysis, the sensitivity to hydrolysis being indicated by the amount of hydrogen bromide per equivalent of bromine per molecule split off in bidistilled water. This amount is defined to be between 2.2 and 30% by mole. It is found upon closer examination, however, that this material is inadequate and that the special bromine compounds are practically only slightly effective, if at all. This result is easily grasped by considering that constant division and flowing together of the organic phase in drop form takes place in styrene suspension polymerization as disclosed by W. P. Hohenstein and H. Mark, J. Polym. Sci. 1(b 2), p. 138, 1946. The hydrogen bromide generated in hydrolysis is constantly transformed from the organic into the aqueous phase, whereby a substantial part of the bromine compound in the styrene polymer cannot become effective. Furthermore, the waste water is contaminated by hydrogen bromide.

SUMMARY OF THE INVENTION

Having in mind the limitations of the prior art, it is an object of the present invention to final form with low minimum mold dwell times, foamed articles from fine particle expandable styrene polymers containing small concentrations of organic bromine compounds.

The organic bromine compounds selected have a chain transfer constant of at least 200 which at 100° C. and within 3 hours in bidistilled water split off less than 1 molar % of hydrogen bromide per equivalent of bromine in the molecule, these bromine compounds being present in proportions from about 0.00005 to less than about 0.01% by weight with respect to the styrene polymer.

Advantageously, the selected bromine compounds are present in proportions between about 0.001 and 0.005%.

Specific examples of the selected bromine compounds include 1,1,1,3-tetrabromo-3-phenylpropane, cis-1,1,2,3,4,4-hexabromobutene-2, trans-1,1,2,3,4,4-hexabromobutene-2, 1,1,2,3,3,4-hexabromo-butane, 1,1,2,2,4,5-Hexabromo-pentane, and 1,1,2,3,4,6-hexabromo-hexene (−2).

The selected bromine compounds are used as follows:

(a) the polymerization of styrene or a mixture thereof with at least one monomer copolymerizable therewith is carried out in the presence of about 0.00005 to 0.01% by weight based on the total of the polymer selected organic bromine compounds of the present invention;

(b) an expanding agent is added before or after polymerization and in a preferred embodiment, the organic bromine compounds are dissolved in the expanding agent and added to the styrene or mixtures thereof before polymerization;

(c) bead polymers having diameters between about 1 and 2 mm are separated from the polymerization;

(d) the bead polymers are pre-foamed and stored;

(e) the pre-foamed material in final foamed.

DESCRIPTION OF THE PREFERRED EMBODIMENTS

It was surprisingly found that with the use of the bromine compounds of the present invention, despite the low concentrations maintained, fine-particulate foams with low minimum mold dwell times are achieved. The bromine compounds cannot be extracted from the finished foam. Close examination shows that they had been integrated into the polymer chain by a chain transfer reaction in the course of the polymerization. No effect of the low concentrations of the present invention of the bromine compounds on the molecular weight of the polystyrene could be ascertained.

Because the bromine compounds are used in only minute amounts, it is important that their effects be applied in the organic phase of the polymerization batch rather than being dissociated when in contact with the aqueous phase.

Accordingly, applicants determined as follows the hydrolytic saponification rate or organic bromine compounds to be selected: 1 g of the substance together with 100 g of bidistilled water is heated to 100° C. for 3 hours with stirring in a pressure-proof stainless steel vessel. The amount of HBr generated is determined following cooling to room temperature by means of potentiometric titration. Bromine compounds suitable according to the present invention generate less than 1 molar % of HBr per equivalent of bromine in the nucleus forming molecule in this evaluation test.

In addition to this criterion, another characteristic is required for the selection of the bromine compounds according to the present invention already active at very low concentrations. This characteristic is based on the reactivity of the bromine atoms contained in the compound during the styrene polymerization initiated by peroxides. It is usually expressed by the transfer constant C defined by the equation $$dT/dM = C\, T/M$$

where T and M are the concentrations of bromine compounds and monomers, respectively. The measurement of such transfer constants is frequently described in the literature. Applicants used a gas-chromatographical method as disclosed in Makromol. Chemie 178, 2249–2255, 1977. It is found that only bromine compounds in very low concentrations as required by the procedure of the present invention cause a clear lowering in the minimum mold dwell time when the transfer constant is of the order of magnitude of that of carbon tetrabromide. However, carbon tetrabromide is ineffective at such low concentrations because when heated in the aqueous phase it splits off approximately 10 molar % of HBr per equivalent of bromine present in the molecule within about 3 hours.

Accordingly, applicable substances are those which under the above test conditions split off less than 1 molar % of HBr equivalent of bromine in the molecule and which simultaneously offer a chain transfer constant of at least 200. Among these compounds are, for example, 1,1,1,3-tetrabromo-3-phenylpropane, trans-1,1,2,3,4,4-hexabromobutene-2, cis-1,1,2,3,4,4-hexabromobutene-2, preferably trans-1,1,2,3,4,4,-hexabromobutene-2.

Styrene polymers in the sense of the present invention are polystyrene and styrene copolymers containing at least 50% of styrene polymerized therein. The styrene polymers contain one or more blowing agents homogeneously distributed. Under ordinary conditions, the following are useful as blowing agents, gaseous or liquid hydrocarbons or halogen hydrocarbons that do not dissolve the styrene polymer and of which have boiling points lower than the polymer softening point. Applicable blowing agents for instance are propane, butane, pentane, cyclopentane, hexane, cyclohexane, or such halogen hydrocarbons as dichlorofluoromethane, methylene chloride, etc. Again, mixtures of blowing agents are useful in the materials. In general, the blowing agents are present in proportions between 3 and 15% by weight in the styrene polymers referred to the polymers.

The polymer again may contain additives such as softeners, stabilizers, dyestuffs, fillers or flame protectants.

Again, the expandable polystyrenes of the present invention may be coated on their surface as disclosed in U.S. Pat. No. 3,789,028 with substances achieving flammation resistance, anti-lumping in frothing, antielectrostatic charging, etc.

The expandable styrene polymers are obtained by polymerizing in the presence of polymerization initiators of organic nature which decompose under the effect of heat into polymerization-triggering radicals. Applicable substances are for instance peroxides such as benzoylperoxide, laurylperoxide or tert.-butylperbenzoate, tert,-butylperoctoate or mixtures of these as well as unstable azo compounds such as azobisisobutyronitrile. The initiators generally are used in proportions between 0.01 and 1% by weight referred to the monomers. The kind of applicable initiator depends on the polymerization temperatures used. Advantageously, mixtures of initiators are used, the temperature of polymerization being adjustable to the half-value time of the initiator. As a rule, the temperature of polymerization is between 60° and 150° C., preferably between 80° and 120° C.

The expandable styrene polymers are useful in bead form by any other form, the particles advantageously being of diameters between 0.3 and 3 mm.

The bromine compounds used according to the present invention should be distributed as homogeneously as possible in the fine-particulate expandable styrene polymer or at least should have been so initially. This is achieved by dissolving the bromine compound in styrene monomer, possibly together with comonomers. Thereupon, the solution is polymerized in aqueous suspension, the blowing agent being added as desired at the beginning, during or at the end of the polymerization. It is furthermore possible to add the bromine compounds together with the blowing agent, the bromine compound dissolved in the blowing agent advantageously being added during the first two hours of polymerization.

The minimum mold dwell times are determined as follows: the pre-foamed styrene polymer particles are welded to a molded body inside a mold by steaming, a pressure probe being mounted at the center of the molded object. The time from onset of cooling to that point at which the pressure inside the molded object has dropped to 1.05 bars is ascertained. Experience shows that at this pressure the molded body can be safely removed. The bromine compounds used according to the present invention may be employed in substantially lesser amounts than those of the state of the art.

EXAMPLES

A mixture of 100 parts by weight of VE (tap) water, 100 parts by weight of styrene, 0.40 parts by weight of benzoylperoxide, 0.1 parts by weight of tert.-butylperbenzoate as well as the additives listed in the following table in the amounts given therein, were stirred in a pressure-proof stirring vessel and raised to 90° C. with stirring. After two hours at 90° C., 5 parts by weight of a 2% aqueous solution of polyvinylalcohol with a saponification number of 140 were added. After a further two hours at 90° C., 7 parts by weight of pentane were added. The mixture following another hour at 90° C. was raised to a temperature of 120° C. and kept at that latter temperature for 6 hours.

The bead fraction with diameters between 1 and 2 mm was pre-foamed in a continuous Rauscher model stirrer-prefoamer to a bulk weight of 15 g/l by means of flowing steam, temporarily stored for 24 hours and then final-foamed in a 500 liter Rauscher model block mold. The minimum mold dwell times listed in the table were determined by the method cited above.

Comparative Example 1 is without additive while Examples 2–5 are representative of the present invention. Comparative Examples 6–10 show the closest prior art bromine compounds and in the higher concentrations used in the prior art.

TABLE

| | Additive | Amount of Additive wt % | Additive saponification rate in molar % | Chain transfer coefficient of additive, C | Minimum mold dwell time in min. |
|---|---|---|---|---|---|
| Comparative Example 1 | none | — | — | — | 50 |
| Exampe 2 | trans-1,1,2,3,4,4-hexabromobutene-2 | 0.0001 | 0.2 | 250 | 14 |
| Example 3 | trans-1,1,2,3,4,4-hexabromobutene-2 | 0.0005 | 0.2 | 250 | 7 |
| Example 4 | cis-1,1,2,3,4,4-hexabromobutene-2 | 0.0001 | 0.2 | 250 | 7 |
| Example 5 | 1,1,1,3-tetrabromo-3-phenylpropane | 0.0001 | 0.5 | 230 | 8 |
| Comparative Example 6 | Hexabromocyclododecane | 0.001 | 0.5 | 40 | 50 |
| Comparative Example 7 | Hexabromocyclododecane | 0.02 | 0.5 | 40 | 20 |
| Comparative Example 8 | Ethoxitetrabromoctane | 0.001 | 2.5 | 80 | 20 |
| Comparative Example 9 | Ethoxitetrabromoctane | 0.02 | 2.5 | 80 | 10 |
| Comparative Example 10 | Carbon tetrabromide | 0.001 | 12 | 250 | 50 |

We claim:

1. In a particulate molding composition for the production of foamed articles consisting essentially of a mixture of an expanding agent and a polymerized styrene monomer or styrene monomer in admixture with comonomers, the improvement comprising said composition containing about 0.00005 to 0.01 percent by weight based on said monomers and comonomers of organic bromine compounds which evidence a chain transfer constant of at least 200 and at 100° C. in bidistilled water said organic bromine compounds split off less than one molar % of hydrogen bromide per equivalent of bromine present in the molecule.

2. The molding composition of claim 1, containing about 0.0001 to 0.005 percent by weight of said organic bromine compounds.

3. The molding composition of claim 2, wherein said organic bromine compounds are selected from the group consisting of 1,1,1,3-tetrabromo-3-phenylpropane, cis-1,1,2,3,4,4-hexabromobutene, trans-1,1,2,3,4,4-hexabromobutene, 1,1,2,3,3,4-hexabromo-butane, 1,1,2,2,4,5-Hexabromo-pentane, and 1,1,2,3,4,6-hexabromo-hexene (−2).

4. The molding composition of claim 2, wherein said organic bromine compounds include 1,1,2,3,4,4-hexabromobutene.

5. In a process for the preparation of shaped bodies based on expanded styrene polymers comprising: the polymerization of styrene or a mixture thereof with at least one monomer copolymerizable therewith, the addition of an expanding agent, pre-forming of the resulting expandable particles, ageing of the formed particles, and molding thereof in a pressure resistant mold, the improvement comprising: carrying out the polymerization in the presence of about 0.00005 to 0.01 percent by weight based on the weight of said styrene or mixture thereof of organic bromine compounds which evidence a chain transfer constant of at least 200 and at 100° C. in bidistilled water said organic bromine compounds split off less than one molar % of hydrogen bromide per equivalent of bromine present in the molecule.

6. The process of claim 5, wherein said polymerization is suspension-polymerization in the presence of radical initiators, and said organic bromine compounds are added dissolved in monomerous styrene before or at the beginning of the polymerization.

7. The process of claim 5, wherein said organic bromine compounds are added dissolved in said expanding agent before or at the beginning of the polymerization.

8. The process of claim 5, wherein said organic bromine compounds are selected from the group consisting of 1,1,1,3-tetrabromo-3-phenylpropane, cis-1,1,2,3,4,4-hexabromobutene, trans-1,1,2,3,4,4-hexabromobutene, 1,1,2,3,3,4-hexabromo-butane, 1,1,2,2,4,5-Hexabromo-pentane, and 1,1,2,3,4,6-hexabromo-hexene (−2).

9. The process of claim 8, containing about 0.0001 to 0.005 percent by weight of said organic bromine compounds.

10. The shaped bodies obtained by the process of claim 5.

* * * * *